US008709350B2

(12) United States Patent
Schenkel et al.

(10) Patent No.: US 8,709,350 B2
(45) Date of Patent: Apr. 29, 2014

(54) COMPACT ION ACCELERATOR SOURCE

(75) Inventors: Thomas Schenkel, San Francisco, CA (US); Arun Persaud, El Cerrito, CA (US); Rehan Kapadia, Berkeley, CA (US); Ali Javey, Emeryville, CA (US)

(73) Assignee: The Regents of the University of California, Oakland, CA (US)

( * ) Notice: Subject to any disclaimer, the term of this patent is extended or adjusted under 35 U.S.C. 154(b) by 60 days.

(21) Appl. No.: 13/451,459

(22) Filed: Apr. 19, 2012

(65) Prior Publication Data
US 2012/0273342 A1 Nov. 1, 2012

Related U.S. Application Data

(60) Provisional application No. 61/477,940, filed on Apr. 21, 2011.

(51) Int. Cl.
B01J 19/08 (2006.01)

(52) U.S. Cl.
USPC ............... 422/186; 250/269.6; 250/423 E; 250/423 F; 376/114; 376/108; 376/190; 376/199; 324/333; 977/700; 977/742

(58) Field of Classification Search
CPC ........... B01J 19/08; B82Y 99/00; H05H 6/00; H01J 2201/30469
USPC ............... 422/186; 250/269.6, 423 E, 423 F; 376/114, 108, 190, 199; 324/333; 977/700, 742
See application file for complete search history.

(56) References Cited

U.S. PATENT DOCUMENTS

| 2009/0046823 | A1* | 2/2009 | Edwards et al. | 376/114 |
| 2011/0169492 | A1* | 7/2011 | Groves | 324/333 |
| 2013/0044846 | A1 | 2/2013 | Schenkel et al. | |

OTHER PUBLICATIONS

Arun Persaud et al., Development of a Compact Neutron Source Bsed on Field Ionization Processes, Jan. 2011, E.O. Lawrence Berkeley National Laboratory, Berkeley, California.
Arun Persaud et al., A Compact Neutron Generator Using a Field Ionization Source, Feb. 2012, E.O. Lawrence Berkeley National Laboratory, Berkeley, California.
Arun Persaud et al., abstract for CAARI 2012, "Field Ionization Studies for Compact Neutron Sources," Aug. 10, 2010.
Arun Persaud et al., Vacuum Nanoelectronics Conference (IVNC), 2010 23rd International, "Development of a Compact Neutron Source Based on Field Ionization Processes," pp. 107-108, Jul. 26, 2010.
B. Naranjo, J. K. Gimzewski, and S. Putterman, Nature 434, 1115 (2005).
I. W. Rangelow and S. Biehl, J. Vac. Sci. Technol. B 19, 916 (2001).

(Continued)

Primary Examiner — Xiuyu Tai
(74) Attorney, Agent, or Firm — Lawrence Berkeley National Laboratory

(57) ABSTRACT

An ion source includes a conductive substrate, the substrate including a plurality of conductive nanostructures with free-standing tips formed on the substrate. A conductive catalytic coating is formed on the nanostructures and substrate for dissociation of a molecular species into an atomic species, the molecular species being brought in contact with the catalytic coating. A target electrode placed apart from the substrate, the target electrode being biased relative to the substrate with a first bias voltage to ionize the atomic species in proximity to the free-standing tips and attract the ionized atomic species from the substrate in the direction of the target electrode.

7 Claims, 3 Drawing Sheets

(56) References Cited

OTHER PUBLICATIONS

J.M. Bonard, N. Weiss, H. Kind, T. Stockli, L. Forro, K. Kern, and A. Chatelain, Advanced Materials 13, 184 (2001).

S. H. Jo, Y. Tu, Z.P. Huang, D.L. Carnahan, D.Z. Wang, and Z.F. Ren, Appl. Phys. Lett. 82, 3520 (2003).

A. Persaud et al. A compact neutron generator using a field ionization source. Review of Scientific Instruments, 83, Feb. 15, 2012, pp. 02B312-1-02B312-4.

A. Persaud et al. Development of a compact neutron source based on field ionization processes. Journal of Vacuum Science and Technology B, Vol. 29, No. 2, Mar./Apr. 2011, pp. 02B107-1-02B107-4.

* cited by examiner

COMPACT ION ACCELERATOR SOURCE

RELATED APPLICATIONS

This application claims priority from Provisional Patent Application Ser. No. 61/477,940 filed Apr. 21, 2011, and this application incorporates by reference all subject matter contained in that provisional patent application.

STATEMENT REGARDING FEDERALLY SPONSORED RESEARCH OR DEVELOPMENT

This invention was made with government support under Contract No. DE-AC02-05CH11231 awarded by the United States Department of Energy to The Regents of the University of California for management and operation of the Lawrence Berkeley National Laboratory. The government has certain rights in this invention.

BACKGROUND

1. Field

The present disclosure relates to an ion source and, more particularly, to nanostructure electrode surface modification with catalytic materials to enhance atomic ionic isotopic species generation for application to neutron generators.

2. Description of Related Art

Neutrons can be used to examine different parameters of geological formations in borehole logging. For oil wells it can report important properties such as the porosity of the soil. Currently many radioactive sources are used in the oil-well logging industry. These generate neutrons in a radioactive decay. One common material used is americium-beryllium sources. Radiological source replacement programs have the goal to reduce the amount of radioactive sources and replace them with for example neutron generators to lower the risk of proliferation and contamination of oil wells and the environment in general as well as reducing health risks for the workers using radioactive sources at the moment. To replace americium-beryllium sources, neutrons with a similar energy spectrum as the radioactive sources have to be produced. Deuterium and tritium fusion reactions (as an example) can be used for this purpose. Here, deuterium or tritium gas is ionized, accelerated and then interacts with a target that is loaded with either deuterium or tritium. During the ionization phase either ions of the atomic or molecular species are formed (e.g. $D^+$ or $D_2^+$). The atomic species has a higher neutron yield compared to the molecular in a fixed acceleration voltage setup due to a higher reaction cross-section.

Thus, a new approach of producing more atomic ions in a generator to increase neutron yields in a fusion reaction is desired.

SUMMARY

A structure and method is disclosed for production of ions that may be used in particle accelerators.

In one aspect of the disclosure, an ion source includes a substrate with a conductive surface, the substrate including a plurality of conductive nanostructures with free-standing tips formed on the substrate. A catalytic coating is formed on the nanostructures, the substrate, or both, for dissociation of a molecular species into an atomic species, the molecular species being brought in contact with the catalytic coating. A target electrode is placed apart from the substrate, the target electrode being biased relative to the substrate with a first bias voltage to ionize the atomic species in proximity to the free-standing tips and attract the ionized atomic species from the substrate in the direction of the target electrode.

DETAILED DESCRIPTION

Figure 1:
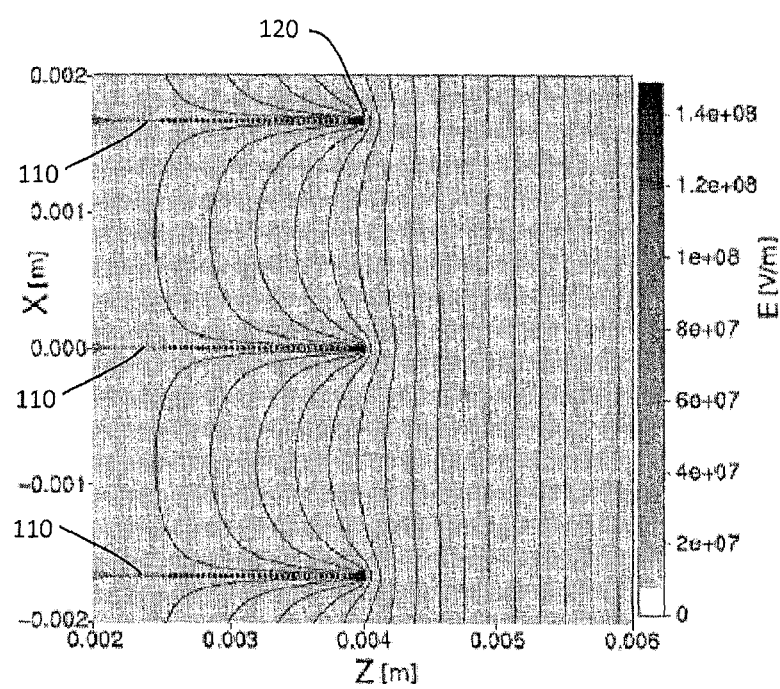
FIG. 1 illustrates a simulation of electric equipotentials near the tips of an embodiment of nanostructures in accordance with the disclosure.

Various aspects of the present invention will be described herein with reference to drawings that are schematic illustrations of idealized configurations of the present invention. As such, variations from the shapes of the illustrations as a result, for example, manufacturing techniques and/or tolerances, are to be expected. Thus, the various aspects of the present invention presented throughout this disclosure should not be construed as limited to the particular shapes of elements (e.g., regions, layers, sections, substrates, etc.) illustrated and described herein but are to include deviations in shapes that result, for example, from manufacturing. By way of example, an element illustrated or described as a rectangle may have rounded or curved features and/or a gradient concentration at its edges rather than a discrete change from one element to another. Thus, the elements illustrated in the drawings are schematic in nature and their shapes are not intended to illustrate the precise shape of an element and are not intended to limit the scope of the present invention.

It will be understood that when an element such as a region, layer, section, substrate, or the like, is referred to as being "on" another element, it can be directly on the other element or intervening elements may also be present. In contrast, when an element is referred to as being "directly on" another element, there are no intervening elements present. It will be further understood that when an element is referred to as being "formed" on another element, it can be grown, deposited, etched, attached, connected, coupled, or otherwise prepared or fabricated on the other element or an intervening element. In addition, when a first element is "coupled" to a second element, the first element may be directly connected to the second element or the first element may be indirectly connected to the second element with intervening elements between the first and second elements.

Furthermore, relative terms, such as "lower" or "bottom" and "upper" or "top," may be used herein to describe one element's relationship to another element as illustrated in the drawings. It will be understood that relative terms are intended to encompass different orientations of an apparatus in addition to the orientation depicted in the drawings. By way of example, if an apparatus in the drawings is turned over, elements described as being on the "lower" side of other elements would then be oriented on the "upper" side of the other elements. The term "lower" can therefore encompass both an orientation of "lower" and "upper," depending of the particular orientation of the apparatus. Similarly, if an apparatus in the drawing is turned over, elements described as "below" or "beneath" other elements would then be oriented "above" the other elements. The terms "below" or "beneath" can therefore encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

In particle accelerators, an ion source creates a particle beam. The technology to create ion sources for particle accelerators depends strongly on the type of particle that needs to be generated: electrons, protons, hydrogen ions or heavy ions. Conventional light nuclei ionic sources providing, for example, isotopes of hydrogen may include use of magnetrons, Penning sources, and rf plasma generators.

Recent developments in compact neutron generators rely on an rf (radio frequency) plasma to dissociate and ionize isotopic hydrogen (i.e., hydrogen, deuterium, and tritium) for introduction to an accelerator region, where the energized ions impact a target containing a selected atomic species that undergoes a fusion reaction with the hydrogen isotope to liberate neutrons. For example, the reaction $$D+D \rightarrow {}^3He+n(2.45\ MeV)$$

may be obtained by populating a titanium target with imbedded deuterons, which then become target nuclei for subsequent deuteron bombardment. The subsequent capture of the incident deuteron by the target deuteron converts the pair to a $^3$He atom and releases a 2.45 MeV neutron.

Disclosed is an embodiment of a compact ionization source that may be applied to accelerators for neutron generators and other application. The disclosed ionization may be smaller and more energy efficient than conventional ionization sources for such application.

To generate the high fields needed for field ionization, use can be made of the fact that a sharp tip, e.g. a single carbon nano-fiber (CNF), in an electric field compresses the equipotential field lines, generating electric fields that may be several thousand times stronger than the field gradient in a parallel capacitor geometry. FIG. 1 is a simulation showing the field enhancement effect of an applied voltage at tips of a nanostructure consisting of thin conductive rods 110 approximately 4 mm long and spaced approximately 1.8 mm apart. Near the tips 120 of the nanostructures the equipotentials become very densely compacted, meaning that the electric field increases dramatically. With a sufficient applied voltage, the electric field in close proximity to the nanostructure tips may be sufficient to cause field ionization of atoms and molecules. Such field enhancement may result in generating a field of several Volts per Angstrom at the tip by applying an acceleration voltage $V_a$ over a distance of a few centimeters.

Figure 2:
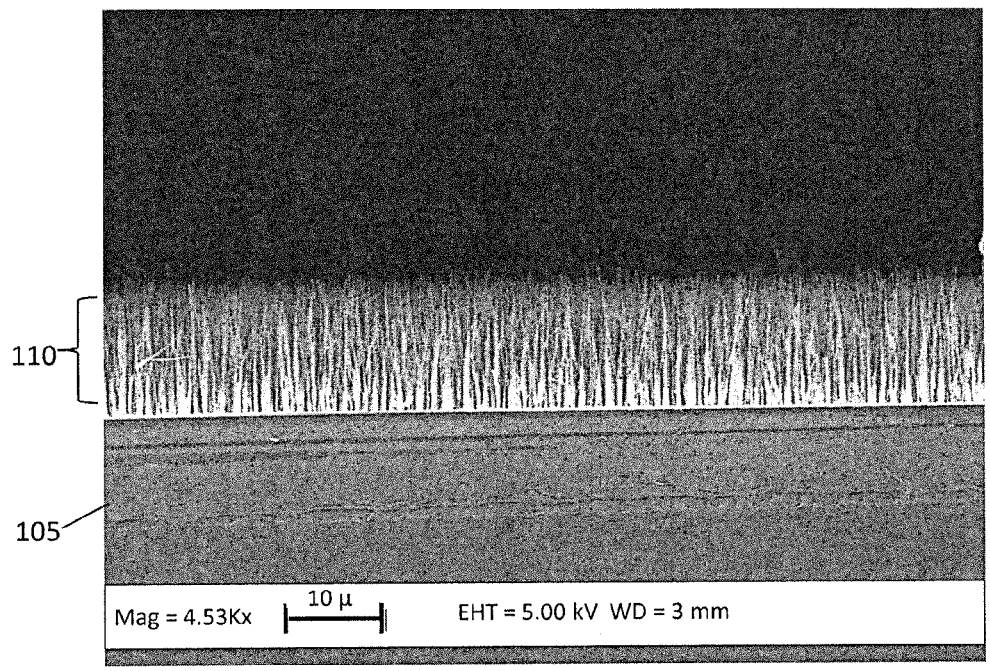
FIG. 2 is a microphotograph of a field of grown carbon nanotubes for field ionization in accordance with the disclosure.

FIG. 2 is a microphotograph of a "forest" of grown carbon nanofibers (CNFs) for field ionization in accordance with the disclosure. The diameter of the CNFs may be about 70 nm. As can be seen in FIG. 2, the growth results in a relatively uniform height, but single nano-fibers also extend above the forest. Those tips 120 at a greater height will show the highest field enhancement factors.

Figure 3:
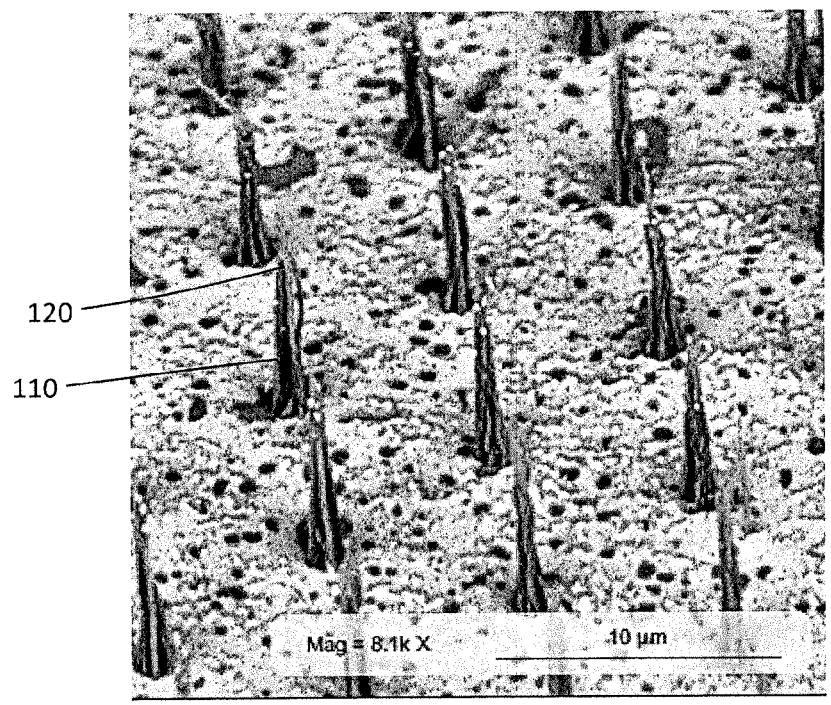
FIG. 3 is a microphotograph of a field of grown carbon nanotubes for field ionization grown in a controlled density pattern in accordance with the disclosure.

FIG. 3 is a microphotograph of a field of CNFs for field ionization using standard photolithographic techniques to establish a seed layer in a regular pattern upon which to grow the array of CNFs. By controlling the spacing between CNFs, a ratio between tip height and tip separation may be optimized for maximum field enhancement at the tips. Whereas the dense growth of CNTs as shown in FIG. 2 can result in tip enhancement being affected by adjacent CNF tips of greater or lesser height, a controlled spacing may enable more uniform field enhancement and optimized field ionization efficiency.

Assuming that the electric field density at the nanostructure tip 120 is sufficient to excite ionization, an ionized molecule or atom may accelerate toward the attracting voltage source. The accelerated species will acquire a kinetic energy according to the applied voltage, and will achieve a velocity v (in a classical approximation) determined by

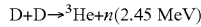

$$E_k = \tfrac{1}{2}mv^2,$$

where m=the mass of the specie, whether the specie is an atom or a molecule. If, for example, the molecular specie is monatomic hydrogen, then the mass is half the mass of a diatomic hydrogen molecule, and therefore the velocity will be increased by a factor $\sqrt{2}$ relative to that of the diatomic hydrogen ion. The increased velocity may have the effect of increasing the cross-section, or efficiency for producing a fusion reaction in a target. For example, neutron generation may be enhanced by promoting the formation of a monatomic specie (rather than, e.g., a diatomic specie) of the ion, whether the atomic specie is hydrogen, deuterium, tritium, or some other nuclear specie.

Figure 4:
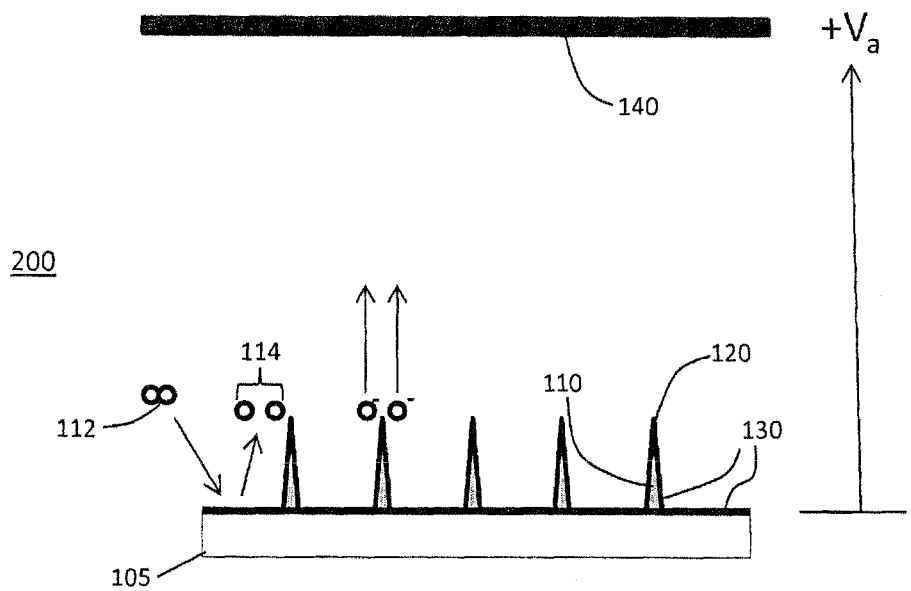
FIG. 4 illustrates an embodiment of a catalytic ion acceleration system in accordance with the disclosure.

To enable preferential ionization of a monatomic specie, FIG. 4 shows an array of conductive nanostructures 110 coated with a catalytic material 130 conducive to in situ dissociation of molecular gases of, for example, hydrogenic isotopes (i.e., $H^2$, $D^2$, $T^2$) into monatomic species. Thus, introducing molecular specie of a gas may provide a source of a monatomic specie via such in situ catalysis. Conventionally, a separate catalytic molecular cracker, well known in the art, may be employed, where the molecular gas is fed through the cracker before being introduced to an ionization component of an accelerator system. In an aspect of the disclosure, the catalytic portion of the system is combined with the ionization portion of the system as the coating material 130 on the nanostructures 110 and/or the substrate 105, resulting in a compact atomic specie ion generator that may operate with less power and produce a greater a greater neutron output for a given amount of ion current than conventional ion generators.

FIG. 4 shows a catalytic ion acceleration system 200 that includes a conductive substrate 115 on which are formed a plurality of nanostructures 110. The nanostructures 110 may be carbon nanotubes (CNTs), silicon nanostructures, silicon carbide nanostructures, or any conductive material which may be capable of forming thin, conductive, needle-like structures, preferably with sharp tips characterized by a tip radius of curvature that may be on the order of a few nanometers, e.g., as small as 5-10 nanometers, but which may have a smaller radius of curvature or a larger one.

The substrate 105, the nanostructures 110, or both, may be coated with a catalytic converter material 130, capable of dissociating the one or more isotopic diatomic molecules of hydrogen. The diatomic molecules are shown as two attached spheres 112, which come in contact with the catalytic converter material and dissociate. The dissociated monatomic atoms 114 are shown as individual spheres 114. The catalytic coating material 130 may be one of Pt, Pd, Ti and Ru, a combination of Pt, Pd, Ti and Ru, or any other conductive material that be found to enable efficient dissociation of molecular isotopes of hydrogen.

An acceleration voltage $V_a$ may be applied between the conductive substrate 105 and a target electrode 140 placed apart from the substrate. $V_a$ may serve a dual purpose: First, the magnitude of the voltage $V_a$ may be such that the electric field intensity at the nanostructure tip 120 is sufficiently enhanced to cause field ionization of the atomic species (or molecular species). Second, where the accelerating target electrode 140 is a target including specified nuclei, the magnitude of the voltage $V_a$ may be such that the collision cross-section for neutron production, gamma ray production, or other nuclear reactions, is satisfactory for a selected application, which may depend on the specified nuclei, the selected monatomic ion as well as a magnitude and polarity of $V_a$.

Figure 5:
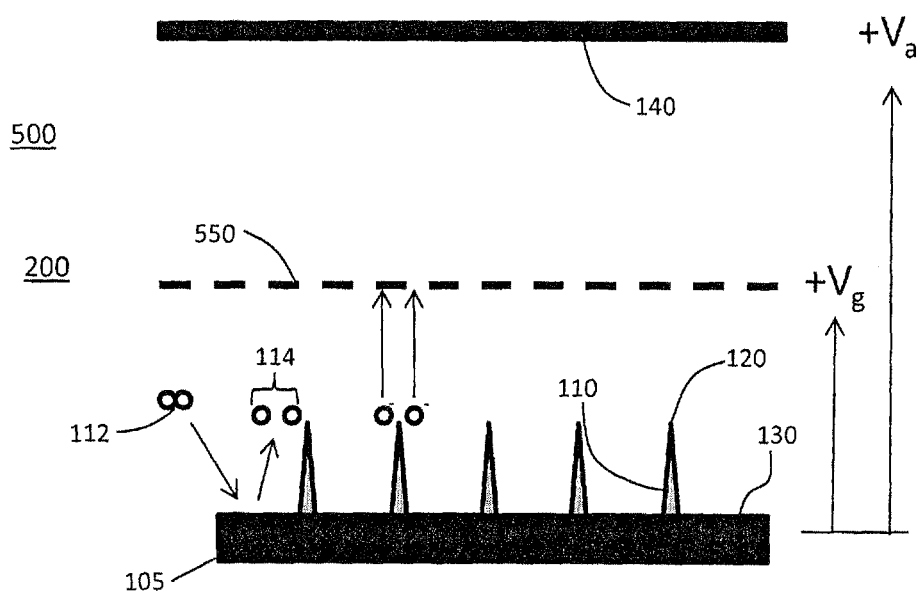
FIG. 5 an embodiment of a catalytic ion acceleration system including a grid electrode in accordance with the disclosure.

In another embodiment of the disclosure, FIG. 5 illustrates a conceptual cross-section view of an ion generator 500. An optional grid electrode 550 is included to provide a grid voltage $V_g$ potential difference between the catalytically coated substrate 105 (including the nanostructures 110) and the grid electrode 550 sufficient to excite field ionization of the atomic species 114. The electrode voltage $V_a$ may still be the primary source for accelerating the ions toward the target electrode 140. $V_a$ may be a voltage between the CNT containing substrate, as shown in FIG. 5, or it may alternatively be a voltage from the grid electrode to the target electrode. However, the grid electrode voltage $V_g$ may be modulated at a faster rate than may be accomplished by modulating $V_a$, which may have a larger magnitude swing than $V_g$, allowing the ion source to generate ions in a modulated and/or pulsed mode.

The various aspects of this disclosure are provided to enable one of ordinary skill in the art to practice the present invention. Modifications to various aspects of forming nanostructures electrodes presented throughout this disclosure will be readily apparent to those skilled in the art of nanotechnology, particle accelerators, catalytic chemistry, applications to other technical arts, and the concepts disclosed herein may be extended to such other applications. Thus, the claims are not intended to be limited to the various aspects of an ion accelerator presented throughout this disclosure, but are to be accorded the full scope consistent with the language of the claims. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An ion source comprising:
    a conductive substrate;
    a plurality of conductive nanostructures with free-standing tips, the plurality of conductive nanostructures being disposed on the conductive substrate;
    a catalytic coating disposed on the plurality of conductive nanostructures and the conductive substrate, the catalytic coating configured to dissociate a molecular species into an atomic species; and
    a target electrode positioned apart from the conductive substrate, the target electrode configured to be biased relative to the conductive substrate with a first bias voltage to ionize the atomic species proximate the free-standing tips of the plurality of conductive nanostructures and to attract ionized atomic species from the conductive substrate in the direction of the target electrode.

2. The apparatus of claim 1, wherein the plurality of conductive nanostructures are at least one of carbon nanotubes, silicon carbide nanostructures, and silicon nano structures.

3. The apparatus of claim 1, wherein the catalytic coating is at least one or more of Pt, Pd, Ti, and Ru.

4. The apparatus of claim 1, wherein the molecular species is at least one of $H^2$, $D^2$, and $T^2$.

5. The apparatus of claim 1, wherein the ionized atomic species is at least one of $H^+$, $D^+$, $T^+$, $H^-$, $D^-$, and $T^-$.

6. The apparatus of claim 1, further comprising:
    a grid electrode positioned between the conductive substrate and the target electrode, wherein the grid electrode is configured to be biased with a second bias voltage to ionize the atomic species proximate the free-standing tips of the plurality of conductive nanostructures and to attract the ionized atomic species in the direction of the grid electrode, wherein the second bias voltage is less than the first bias voltage and generates a greater electric field than an electric field generated by the first bias voltage.

7. The apparatus of claim 6, wherein a change in a value of the second bias voltage is configured to change a rate of ionization of the atomic species.

* * * * *